United States Patent
Chen

(10) Patent No.: US 8,246,340 B2
(45) Date of Patent: Aug. 21, 2012

(54) LIGHT GUIDE PLATE INJECTION MOLDING DIE

(75) Inventor: Hsiang-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 349 days.

(21) Appl. No.: 12/648,048

(22) Filed: Dec. 28, 2009

(65) Prior Publication Data
US 2011/0045121 A1 Feb. 24, 2011

(30) Foreign Application Priority Data
Aug. 19, 2009 (CN) .......................... 2009 1 0305803

(51) Int. Cl.
B29C 33/30 (2006.01)
(52) U.S. Cl. .................... 425/441; 425/190; 425/192 R; 425/DIG. 5
(58) Field of Classification Search ................. 425/190, 425/192 R, 556, DIG. 5, DIG. 58, 441
See application file for complete search history.

(56) References Cited

U.S. PATENT DOCUMENTS

| | | | | |
|---|---|---|---|---|
| 3,469,284 A * | 9/1969 | Ross | | 425/589 |
| 3,490,100 A * | 1/1970 | Funke | | 425/236 |
| 3,718,420 A * | 2/1973 | Florjancic | | 425/441 |
| 4,472,128 A * | 9/1984 | Ruhl | | 425/186 |
| 4,484,880 A * | 11/1984 | Schwarz | | 425/192 R |
| 4,861,254 A * | 8/1989 | Takeuchi et al. | | 425/190 |
| 5,061,164 A * | 10/1991 | Sabado et al. | | 425/116 |
| 5,114,329 A * | 5/1992 | Nakamura et al. | | 425/190 |
| 6,120,279 A * | 9/2000 | Vovan | | 425/190 |
| 6,814,560 B2 * | 11/2004 | Casteel | | 425/192 R |
| 7,462,027 B2 * | 12/2008 | Chien | | 425/192 R |
| 7,563,088 B2 * | 7/2009 | Tsai | | 425/193 |
| 7,670,134 B2 * | 3/2010 | Hwang et al. | | 425/589 |
| 7,922,472 B2 * | 4/2011 | Kuo | | 425/190 |
| 2007/0090554 A1 * | 4/2007 | Wykoff et al. | | 264/102 |
| 2007/0122514 A1 * | 5/2007 | Tsai | | 425/190 |
| 2009/0115098 A1 * | 5/2009 | De Vries et al. | | 264/272.13 |

* cited by examiner

*Primary Examiner* — Yogendra Gupta
*Assistant Examiner* — Emmmanuel S Luk
(74) *Attorney, Agent, or Firm* — Altis Law Group, Inc.

(57) ABSTRACT

A injection molding die includes a first molding unit, a second molding unit, at least one slide block, and a number of elastic elements disposed between the slide block and the first molding unit. The first molding unit includes a first molding surface and a sidewall surrounded the first molding surface. At least one gap is defined in an edge between the sidewall and the first molding surface. The gas hole is exposed at the gap for providing gas to the gap. The slide block is capable of moving toward or away from the sidewall, and includes a protrusion for engaging in the gap to cover the gas hole. The protrusion includes a protrusion surface coplanar with the first molding surface. The second molding unit includes a second mold surface defining a mold cavity cooperated with the first molding surface, the protrusion surface, and the at least one slide block.

9 Claims, 5 Drawing Sheets

LIGHT GUIDE PLATE INJECTION MOLDING DIE

BACKGROUND

1. Technical Field

The present disclosure relates to injection molding technology, and particularly, to an injection molding die for manufacturing light guide plates.

2. Description of Related Art

Generally, a light guide plate includes a light emitting surface for emitting light. To enhance the emitting reliability of the light, the light emitting surface should be made very smooth in manufacture. The light guide plate is commonly manufactured via injection molding. In the injection molding process, molten molding material is injected into the mold cavity of a mold assembly to form a light guide plate. The mold assembly includes a molding core with a smooth surface to form the light emitting surface. When the mold assembly is separated, the light guide plate often sticks to the smooth surface of the molding core because a vacuum created between the light emitting surface and the smooth surface of the molding core.

What is needed, therefore, is a light guide plate injection molding die capable of allowing easy separation of the light guide plate from the injection molding die to overcome the above-described problem.

BRIEF DESCRIPTION OF THE DRAWINGS

Many aspects of the present light guide plate injection molding die can be better understood with reference to the following drawings. The components in the drawings are not necessarily drawn to scale, the emphasis instead being placed upon clearly illustrating the principles of the present light guide plate injection molding die.

DETAILED DESCRIPTION

Embodiments of the present disclosure will now be described in detail below, with reference to the accompanying drawings.

Figure 1:
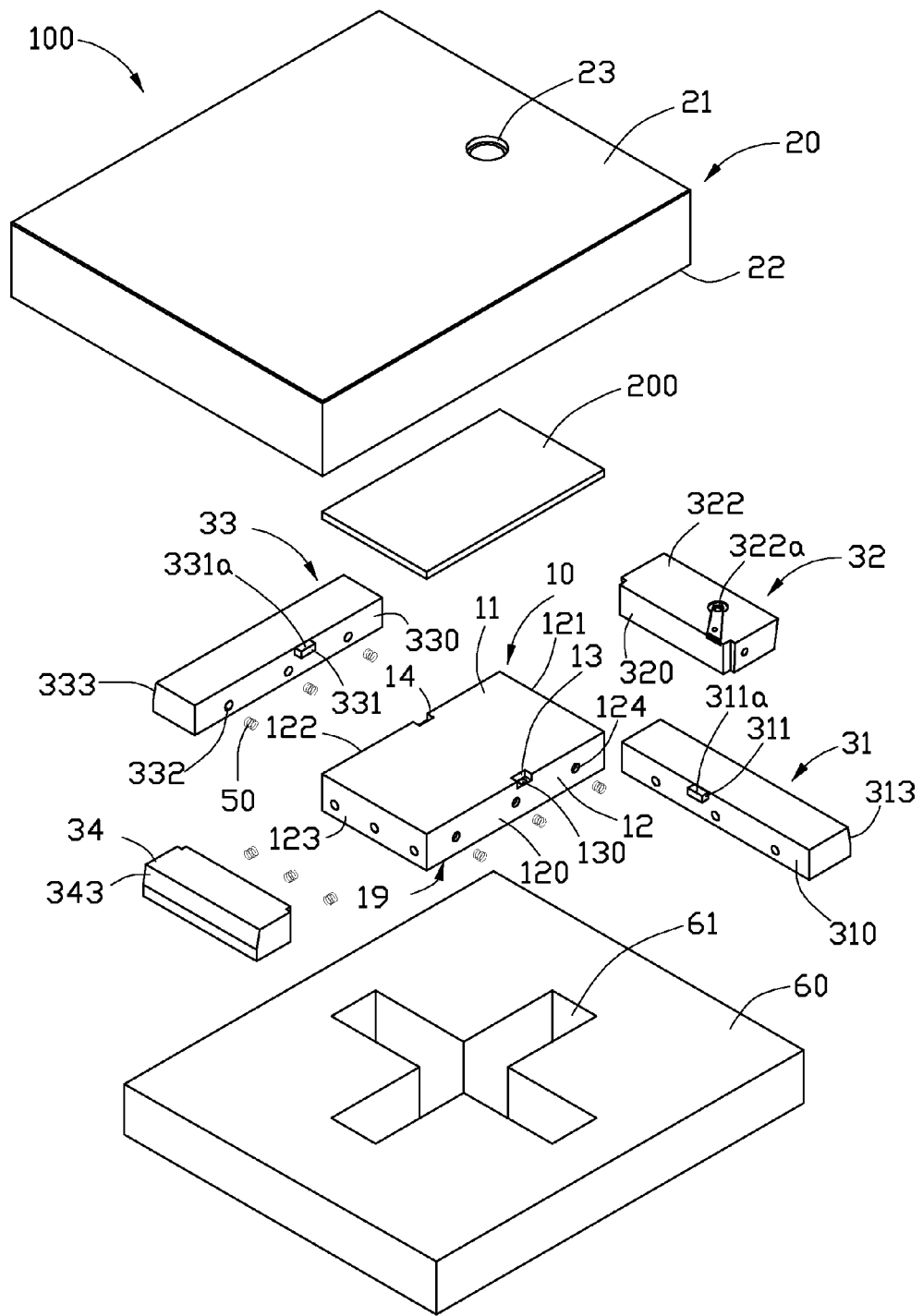
FIG. 1 is a schematic, exploded view of a light guide plate injection molding die according to an exemplary embodiment.
Figure 2:
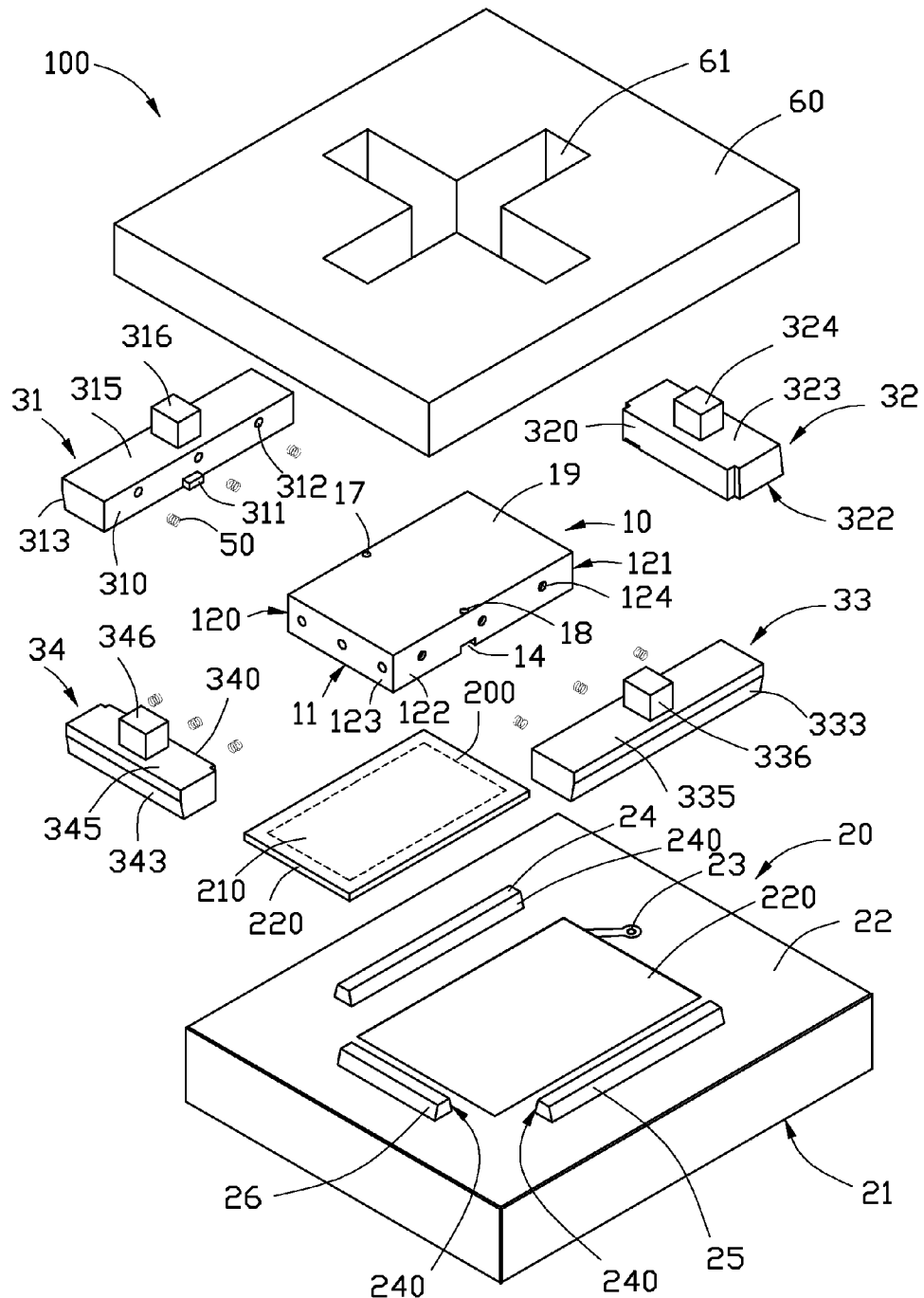
FIG. 2 is similar to FIG. 1, but showing the light guide plate injection molding die inverted.

Referring to FIGS. 1 and 2, a light guide plate injection molding die 100, according to an exemplary embodiment, is shown. The light guide plate injection molding die 100 includes a first molding unit 10, a second molding unit 20, a first slide block 31, a second slide block 32, a third slide block 33, a fourth slide block 34, a blower (not shown), nine elastic elements 50, and a holding board 60.

The first molding unit 10 includes a first molding surface 11, a peripheral sidewall 12 surrounding the first molding surface 11, a first gas channel 15 (shown in FIG. 4), a second gas channel 16 (shown in FIG. 4), and a second surface 19 opposite to the first molding surface 11. In the present embodiment, the first molding unit 10 is a rectangular molding core. The peripheral sidewall 12 includes a first side surface 120, a second side surface 121, a third side surface 122 opposite to the first side surface 120, a fourth side surface 123 opposite to the second side surface 121, and nine first-receiving holes 124 for receiving the elastic elements 50. In the present embodiment, the first-receiving hole 124 is a blind hole. The nine first-receiving holes 124 are grouped into three equal groups. The groups are located on the first side surface 120, the third side surface 122, and the fourth side surface 123 respectively. The elastic element 50 is a spring coil.

A first gap 13 is defined in an edge between the first side surface 120 and the first molding surface 11. In the present embodiment, the first gap 13 is a rectangular groove. The first gap 13 can also be a triangular groove, or a trapezoidal groove. A first circular gas hole 130 is exposed at the first gap 13 for providing pressurized gas to the first gap 13.

A second gap 14 is defined in an edge between the third side surface 122 and the first molding surface 11. The configuration of the second gap 14 is the same as the configuration of the first gap 13. A second circular gas hole 140 is exposed at the second gap 14 for providing pressurized gas to the second gap 14.

A light guide plate 200 includes a working area 210 surrounded by a holding area 220. The working area 210 is located at the center of the light guide plate 200. The first gap 13 and the second gap 14 face the holding area 220 during the molding process.

Figure 4:
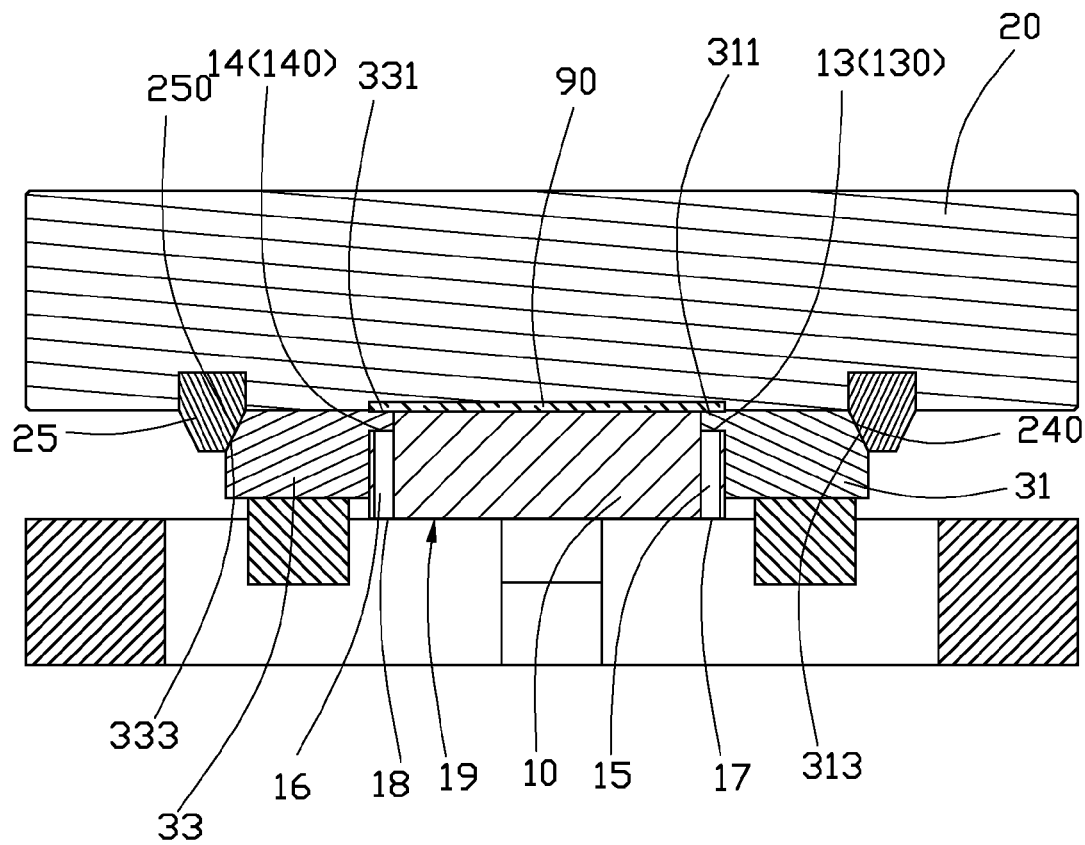
FIG. 4 is a cross-sectional view of the light guide plate injection molding die incorporated with a light guide plate.
Figure 5:
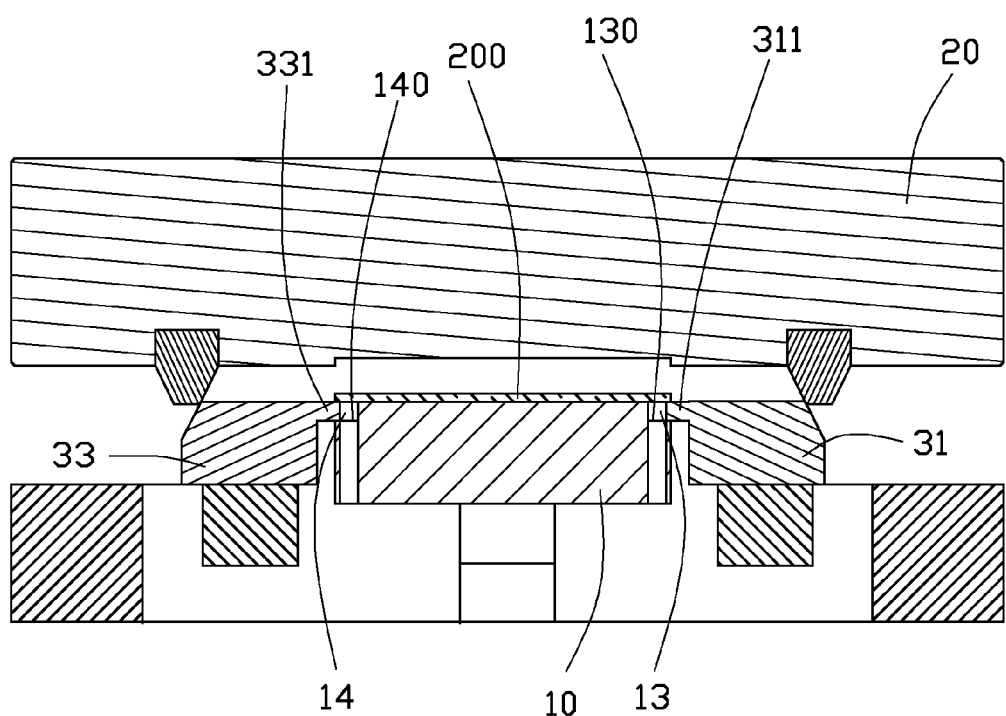
FIG. 5 is similar to FIG. 4, but showing the light guide plate injection molding die separated from the light guide plate.

Referring to FIGS. 4 and 5, the first gas channel 15 and the second gas channel 16 are formed in the first molding unit 10. A first input hole 17 and a second input hole 18 are defined in the second surface 19. The first gas channel 15 connects the first input hole 17 to the first circular gas hole 130, and is used for introducing the gas to the first gap 13. The second gas channel 16 connects the second input hole 18 to the second circular gas hole 140, and is used for introducing the gas to the second gap 14. The blower is used for blowing high pressure gas to the first input hole 17 and the second input hole 18.

Figure 3:
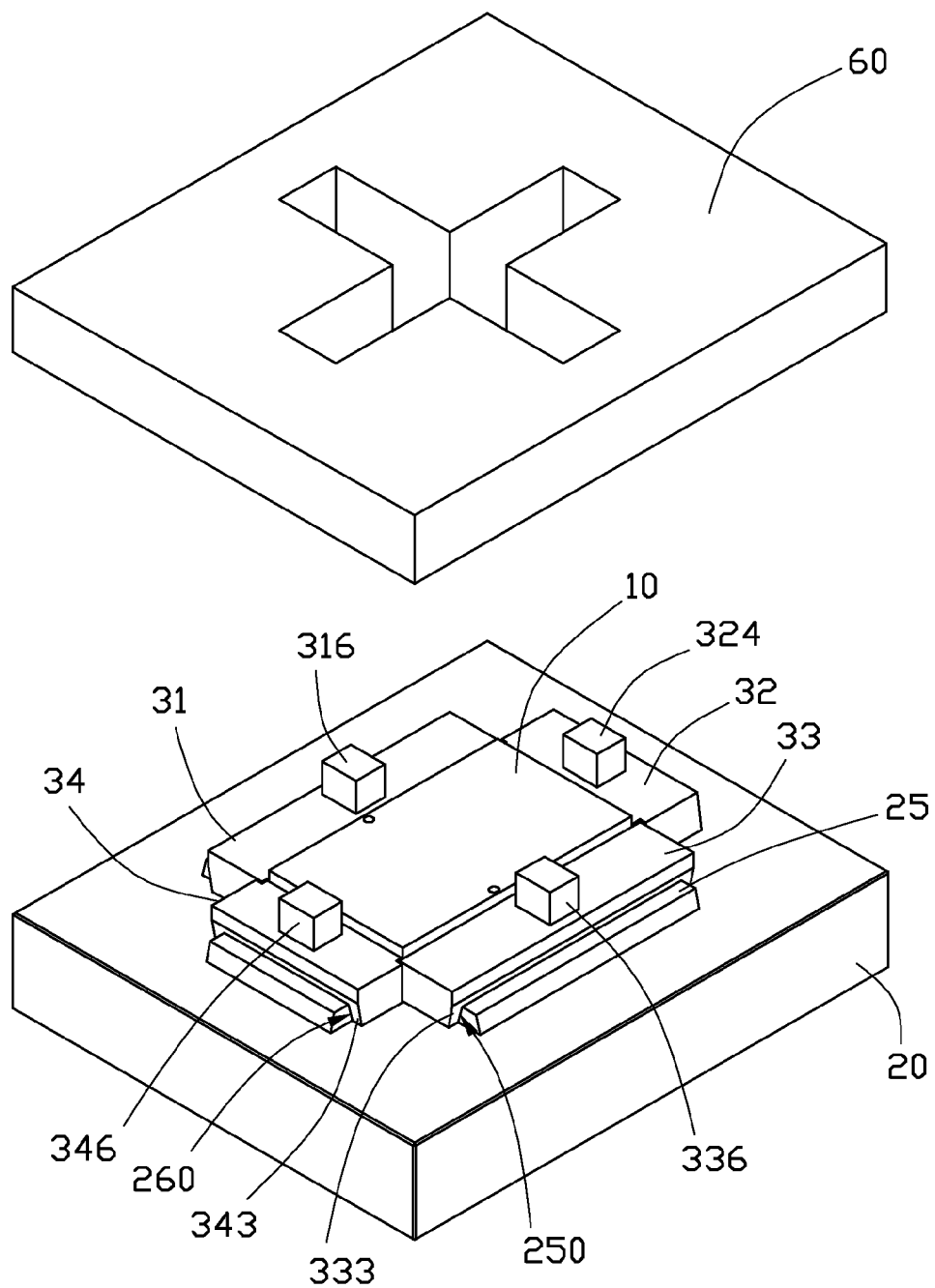
FIG. 3 is a schematic, partial exploded view of the light guide plate injection molding die of FIG. 2.

Referring to FIGS. 2 and 3, the holding board 60 holds the first molding unit 10, the first slide block 31, the second slide block 32, the third slide block 33, and the fourth slide block 34. The first molding unit 10 is fixed on the holding board 60. A cross sliding slot 61 is defined at the center of the holding board 60.

Referring to FIGS. 1 and 2, the second molding unit 20 includes a second molding unit surface 21, a second mold surface 22 opposite to the second molding unit surface 21, a feeding channel 23, a first pressing block 24, a second pressing block 25, and a third pressing block 26.

The feeding channel 23 extends through the second molding unit surface 21 and the second mold surface 22. The second mold surface 22 includes a molding area 220. In the present embodiment, the molding area 220 is a rectangular area. The rectangular area 220 faces the first molding surface 11 of the first molding unit 10. The first pressing block 24, the second pressing block 25, and the third pressing block 26 are in a rectangular arrangement surrounding the molding area 220. Each of the first pressing block 24, the second pressing block 25, and the third pressing block 26 includes a slanted surface 240 slanted relative to the second mold surface 22 facing toward to the molding area 220.

The first slide block 31, the third slide block 33, and the fourth slide block 34 are slidable relative to the first molding unit 10. The second slide block 32 is fixed relative to the first molding unit 10.

In the present embodiment, the first slide block 31 includes a first contact surface 310 facing the first molding unit 10, a first protrusion 311, a first pressing surface 313, a first sliding surface 315 facing the holding board 60, and a first sliding portion 316.

In the present embodiment, the first contact surface 310 faces the first side surface 120 of the first molding unit 10. Three second-receiving holes 312 are defined in the first contact surface 310, and face the first-receiving holes 124 in the first side surface 120. The second-receiving hole 312 is a blind hole. The elastic elements 50 are pressed between the first-receiving holes 124 and the second-receiving holes 312. The first pressing surface 313 is a slanted surface away from the first contact surface 310, and contacted with the slanted surface 240 of the first pressing block 24. When the first pressing surface 313 is pressed by the slanted surface 240, the first slide block 31 will move toward the first molding unit 10. The first sliding portion 316 is fixed on the first sliding surface 315, and is slidable along the cross sliding slot 61 of the holding board 60.

The first protrusion 311 is engaging in the first contact surface 310 to cover the gas hole 130. In the present embodiment, the first protrusion 311 is a rectangular protrusion. The first protrusion 311 includes a first protrusion surface 311a facing the second molding unit 20. When the first protrusion 311 is received in the first gap 13, the first protrusion 311 plugs the first circular gas hole 130, and the first protrusion surface 311a is coplanar with the first molding surface 11.

The configuration of the third slide block 33 is substantially same as the first slide block 31. The third slide block 33 includes a third contact surface 330 facing the third side surface 122 of the first molding unit 10, a second protrusion 331, a third pressing surface 333 contacted with the slanted surface 240 of the second pressing block 25, a third sliding surface 335, and a third sliding portion 336. Three third receiving holes 332 are defined on the third contact surface 330, and face the first-receiving holes 124. The elastic elements 50 are pressed between the first-receiving holes 124 and the third receiving holes 332. The third sliding surface 335 faces the holding board 60. The third sliding portion 336 is fixed on third sliding surface 335, and is slidable along the cross sliding slot 61 of the holding board 60.

The second protrusion 331 is located on the third contact surface 330. The second protrusion 331 includes a second protrusion surface 331a facing the second molding unit 20. When the second protrusion 331 is received in the second gap 14, the second protrusion 331 chokes the second circular gas hole 140, and the second protrusion surface 331a is coplanar with the first molding surface 11.

The configuration of the fourth slide block 34 is substantially same as the first slide block 31. The fourth slide block 34 includes a fourth contact surface 340 facing the fourth side surface 123, a fourth pressing surface 343 contacted with the slanted surface 240 of the third pressing block 26, a fourth sliding surface 345 facing the holding board 60, and a fourth sliding portion 346. Three fourth receiving holes (not shown) are defined on the third contact surface 340, and face the first-receiving holes 124. The elastic elements 50 are pressed between the first-receiving holes 124 and the fourth receiving holes. The fourth sliding portion 346 is fixed on the fourth sliding surface 345, and is slidable along the cross sliding slot 61 of the holding board 60.

The second slide block 32 includes a second contact surface 320, a resisting surface 322, a second sliding surface 323, and a second sliding portion 324. The second contact surface 320 is attached to the second side surface 121. The second resisting surface 322 faces the second molding unit 20. A runner 322a is located on the second resisting surface 322, and communicates with the feeding channel 23 during the molding process. The second sliding surface 323 faces the holding board 60. The second sliding portion 324 is fixed on second sliding surface 323. The second sliding portion 324 is fixed in the cross sliding slot 61 of the holding board 60.

Referring to FIG. 4, when the first molding unit 10 is incorporated with the second molding unit 20, the first pressing surface 313, the third pressing surface 333, and the fourth pressing surface 343 will be pressed by the slanted surface 240 of the second molding unit 20, and the first slide block 31, the third slide block 33, the fourth slide block 34 moves toward to the first molding unit 10 to resist the peripheral sidewall 12. The elastic elements 50 are pressed between the slide blocks and the first molding unit 10. The first protrusion 311 and the second protrusion 331 are received in the first gap 13 and the second gap 14 to choke the first circular gas hole 130 and the second circular gas hole 140. The first molding surface 11, the second mold surface 22, the first protrusion surface 311a, and the second protrusion surface 331a cooperatively define a mold cavity 90. The molding material is injected into the mold cavity 90 through the feeding channel 23 to mold the light guide plate 200.

Referring to FIG. 5, when the first molding unit 10 is separated from the second molding unit 20 to obtain the light guide plate 200, the first slide block 31 and the third slide block 33 are pushed away from the first molding unit 10 by the elastic elements 50. When the first protrusion 311 and the second protrusion 331 are partially taken out from the first gap 13 and the second gap 14, and the first circular gas hole 130 and the second circular gas hole 140 are exposed, the blower blows high pressure gas to the first gap 13 and the second gap 14 to break the vacuum between the first molding unit 10 and the light guide plate 200.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A light guide plate injection molding die comprising:
    a first molding unit comprising a first molding surface and a peripheral sidewall surrounding the first molding surface, at least one gap defined in an edge between the first molding surface and the peripheral sidewall, and at least one gas hole exposed at the at least one gap for providing pressurized gas to the at least one gap;
    at least one slide block opposite to the peripheral sidewall, the slide block capable of moving toward or away from the peripheral sidewall, the slide block comprising a protrusion for engaging in the gap to cover the gas hole, the protrusion comprising a protrusion surface coplanar with the first molding surface;
    a plurality of elastic elements disposed between the at least one slide block and the peripheral sidewall;
    a second molding unit comprising a second mold surface, wherein when the first molding unit is incorporated with the second molding unit, the second molding unit presses the at least one side block to move toward the peripheral sidewall, the protrusion engages in the gap to cover the gas hole, all of the second mold surface, the first molding surface, the protrusion surface, and the at least one slide block cooperatively define a mold cavity.

2. The light guide plate injection molding die as claimed in claim 1, wherein a gas channel is defined in the first molding unit, and the gas channel is connected to the at least one gas hole.

3. The light guide plate injection molding die as claimed in claim 2, wherein the elastic element is a spring coil.

4. The light guide plate injection molding die as claimed in claim 1, wherein a plurality of first-receiving holes are defined in the peripheral sidewall, a plurality of second-receiving holes are defined in the slide block separately corresponding to the first-receiving holes, the elastic element is arranged between the first-receiving hole and the second-receiving hole.

5. The light guide plate injection molding die as claimed in claim 4, wherein the first-receiving hole and the second-receiving hole are blind holes.

6. The light guide plate injection molding die as claimed in claim 1, wherein the gap is a rectangular groove.

7. The light guide plate injection molding die as claimed in claim 1, wherein the at least one hole has a circular cross-section.

8. The light guide plate injection molding die as claimed in claim 1, wherein the second molding unit comprises a surface slanted relative to the second mold surface facing the molding cavity, the at least one slide block comprises a pressing surface for coming into contact with the slanted surface.

9. The light guide plate injection molding die as claimed in claim 1, further comprising a holding board to hold the first molding unit and the at least one slide block.

* * * * *